United States Patent [19]
VeNard, II

[11] 3,746,963
[45] July 17, 1973

[54] POLYPHASE INVERTER WITH D.C. SUPPLY

[75] Inventor: Dan L. VeNard, II, Bonners Ferry, Idaho

[73] Assignee: Static Power, Inc., Irvine, Calif.

[22] Filed: June 9, 1971

[21] Appl. No.: 151,598

Related U.S. Application Data
[63] Continuation of Ser. No. 868,455, Oct. 22, 1969, abandoned.

[52] U.S. Cl............................ 321/2, 321/9, 321/10
[51] Int. Cl. ............................................ H02m 5/44
[58] Field of Search............................. 321/2, 9, 10

[56] References Cited
UNITED STATES PATENTS
| | | |
|---|---|---|
| 1,920,948 | 8/1933 | Crouse................................. 333/79 |
| 3,192,464 | 6/1965 | Johnson et al.......................... 321/2 |
| 3,325,716 | 6/1967 | Gomi...................................... 321/2 |
| 3,461,372 | 8/1969 | Pickup et al........................... 321/9 |
| 3,510,753 | 5/1970 | Lawn............................... 321/10 X |

Primary Examiner—William M. Shoop, Jr.
Attorney—Richard A. Marsen

[57] ABSTRACT

Polyphase static inverter system of substantial power rating, energized by a direct current source. The source output is filtered to maintain smooth unidirectional power input to the silicon controlled rectifier array of the inverter. The filtering utilizes a shunt trap, tuned to twice the frequency of the system power output. Significant economy and reduction in size and weight for the filtering are realized.

3 Claims, 5 Drawing Figures

INVENTOR,
DAN L. VENARD II
BY
ATTORNEY.

POLYPHASE INVERTER WITH D.C. SUPPLY

REFERENCE TO RELATED APPLICATION

This application is a continuation of application Ser. No. 868,455, filed Oct. 22, 1969, and now abandoned.

BACKGROUND AND SUMMARY OF THE INVENTION

Static inverters, in practice, use banks of silicon controlled rectifiers. These are powered by direct current in an important class of polyphase inverter systems. Such D.C. source may be in the form of a battery, or a bridge rectifier energized by an A.C. generator. Heretofore, a sizeable filter pack was used at the output of the D.C. source, in order to insure smooth current with low ripple content to the inverter. For example, such brute force filter pack required a capacitor of several thousand microfarads. In a 60 KVA system with a 270 volt D.C. source or link, the D.C. filter therefor weighed 16 pounds. This filter weight is prohibitive for airborne inverters, and is costly at best.

In accordance with the present invention, an inverter input filter comprised of a shunt trap is connected across the output of the D.C. supply to the inverter. Such trap is tuned to twice the frequency of the output inverter ($f_o$) power. For example, if $f_o$ is 400 hertz, the filter trap resonance is set at 800 hertz. A single inductor (L) and capacitor (C) circuit is found to be practical and effective. For the aforesaid 60 KVA inverter, a filter trap hereof comprised a coil of 340 microhenries, and a capacitor of 100 microfarads, both with nominal weight.

Use of the aforementioned brute force filter pack, also commonly termed "rectifier source filter" is exemplified by Gomi, U.S. Pat. No. 3,325,716. The design of such rectifier source filters is influenced by the frequencies which are integral multiples of the a.c. source frequency feeding the rectifier. In contrast, design of the "inverter input filter" of the subject invention is dependent on the inverter output frequency ($fo$) not the frequency of the a.c. source feeding the rectifier.

The inverter input filter is particularly required where the polyphase loading on the inverter system becomes unbalanced for any reason. The invention filter-trap has been found to overcome ripple or voltage modulation at the D.C. link, as generally caused by system output unbalancing. It is applicable with such D.C. supply generated by a rectifier bank from alternating current, or a battery; as well as for single or polyphase inverters.

DETAILED DESCRIPTION OF THE INVENTION

Figure 1:
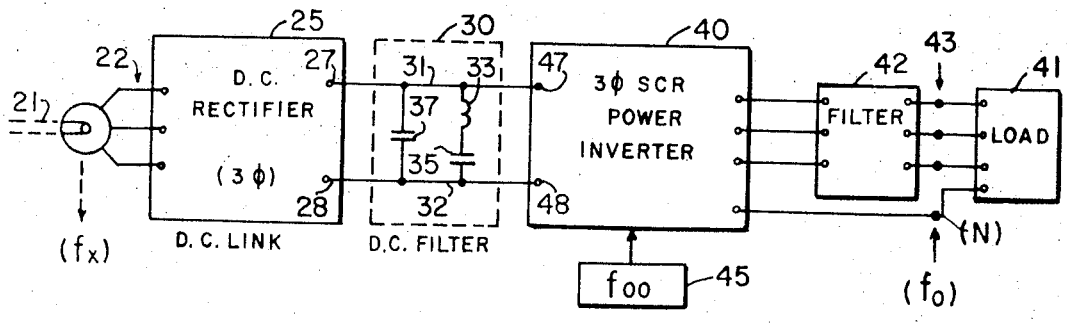
FIG. 1 is a block diagram of a polyphase power inverter system using the invention inverter input filter at its D.C. source.

FIG. 1 illustrates a typical polyphase SCR inverter 40 energized by a D.C. rectifier 25, and powering a polyphase load 41. The D.C. supply 25 may be a static polyphase bridge rectifier bank, fed by polyphase alternator 20. The generator 20 is driven by a prime mover (not shown) at its shaft 21. Its frequency ($f_x$) may be variable or "wild," as driven by a jet engine aboard an aircraft. Its output terminals 22 connect to the input of D.C. link 25. The inverter 40 output 75 is applied to an A.C. filter 42 to present polyphase current at the fundamental frequency ($f_o$) as three-phase, to load 41 through its output leads 43. The SCR operation of inverter 40 is controlled by a basic clock 45 at frequency $f_{oo}$. An exemplary three-phase two-channel inverter therefor is described hereinafter in connection with FIGS. 4 and 5.

In accordance with the present invention, a unique and most effective inverter input filter 30 is connected to the output 27, 28 of the D.C. rectifier or link 25, and in turn to the input 47, 48 of inverter 40. The filter 30 essentially consists of a series L-C trap 33, 35 connected in shunt across through leads 31, 32. The shunt capacitor 37 is optional, yet useful for filtering higher frequency components than shunted by the tuned L-C trap 33, 35. Filter 33, 35 is proportioned to be resonant at twice that of the basic frequency ($f_o$) of the system output 43, Thus the inductance (L) of inductor 33 and the capacitance (C) of capacitor 35 are respectively proportioned so that their resonant frequency as a unitary trap is $2f_o$. For example, in a 400 hertz inverter system, the inductance (L) of inductor 33 is the order of 340 microhenries; and the capacitance (C) of capacitor 35, 100 microfarads. Their resultant series resonant frequency is thereby 800 hertz, as required herein.

Figure 2:
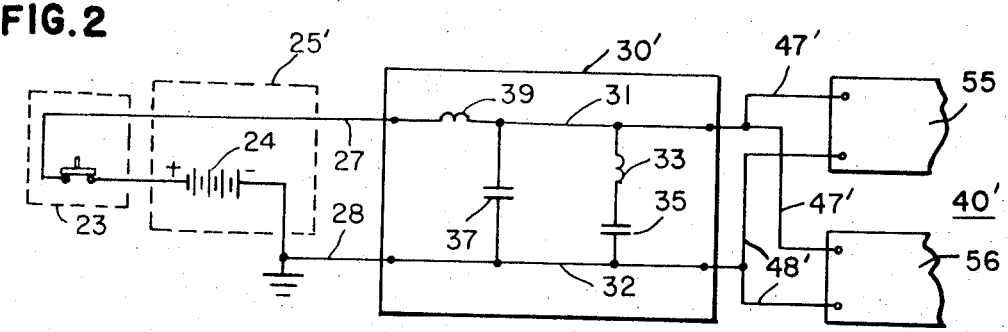
FIG. 2 is an enlarged diagram of a section of the FIG. 1 system, modified in part.

The D.C. link 25 for a 400 hertz inverter of 60 kilovolt-ampere rating, in practice, may have a 270 D.C. volt output at 27, 28 to provide a 200 A.C. line-to-line voltage at 43. A brute force prior art filter therefor used a D.C. line inductor that weighed about 15 pounds, and two 5,000 microfarad capacitors shunted from across the inductor to the other D.C. line. The invention shunt resonant trap 33, 35 of good Q design series-tuned 800 hertz provided considerable filter weight savings in cost, weight and space. As stated above, the supplementary capacitor 37 for filter 30, also of nominal size and weight, for shunting-off higher frequency ripples namely above $2f_o$, while those for a prior art filter were for were for the fundamental $f_o$. Capacitor 37 in practice may be 100 microfarads or less. A second inductance 39 may be inserted in a line of the basic filter 30' as shown in FIG. 2. Again, it is of relatively small size and inductance, serving to further smooth higher order frequencies where desired; with or without auxiliary capacitor 37.

The D.C. link 25' of the FIG. 2 system is shown as a battery 24, to illustrate that the invention filter 30 or 30' are a advantageously applicable thereto as well. In an uninterrupted type of power supply system (UPS), the battery 24 is switched in, as by a unit at 23, in place of the alternator rectifier 20–25, as is known in the art. The inverter input filter 30 or 30' connected at their respective output terminals serves either supply, as will now be understood. The polyphase inverter system 40 may be constructed with plural channels, as 55, 56 for inverter 40'. Their polyphase output in stepped waveform, has more steps and less output filter 41 requirement. Such system as 40' is described in detail in my U.S. Pat. No. 3,447,010, for "Synthetic Wave Three Phase Alternating Current Power Supply System." It is noted that the filtering principles and filter units as 30, 30' of this invention are also effective for such multi-channel inverter systems. Single phase SCR inverters, fed with a D.C. source corresponding to 25, 25' can advantageously use such D.C. input filtering.

Figure 3:
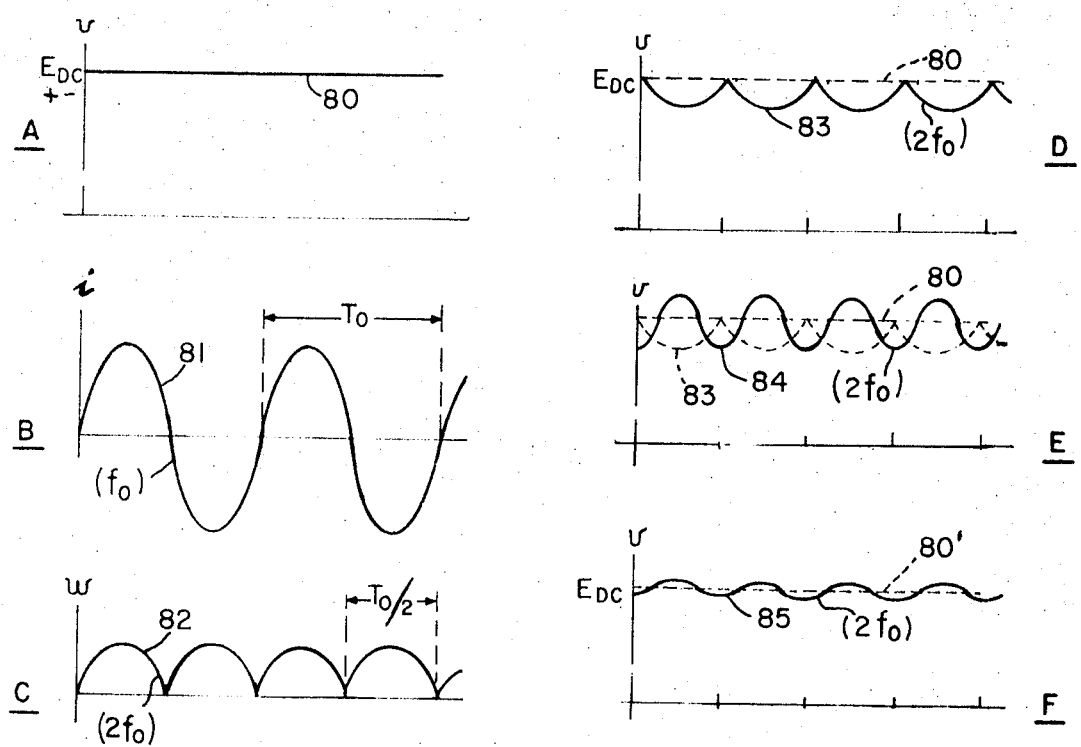
FIG. 3 illustrates voltage and current curves used in an explanation of the operation of the invention hereof.

The principles and operation of the invention inverter input filter 30, 30' are now set forth in conjunction with FIG. 3. The idealized D.C. voltage level is illustrated at 80 in FIG. 3A, at $E_{DC}$ rated source output for lines 27, 28, such as 270 volts. The sinusoidal curve 81 of FIG. 7B is at the basic system frequency $f_o$, as 400 hertz. A single phase is illustrated, it being understood that polyphase output are contimplated. In essence, when an unbalance occurs in the load 41, energy is withdrawn from the D.C. link 25 as sinusoidal half-cycles. This occurs at twice the basic frequency rate, namely at $2f_o$, as illustrated at 82 in FIG. 3C. The loops of link power (w) curve 82 are at half-periods $T_o2$, as indicated. FIG. D illustrates the voltage ripple 83, at the $2f_o$ rate basically induced at source output 27, 28, with respect to the rated level $E_{DC}$. The second harmonic trap 33, 35 of filter 30 or 30' however absorbs energy from its lines 31, 32 sinusoidally, in correspondance with the induced ripple 83, as shown by curve 84 in FIG. 3E. However, curve 84 is advantageously 180° out-of-phase with respect to the ripple voltage 83, and at $2f_o$ in frequency like pulses 83. FIG. 3F shows the resultant filtered voltage output 85 from the D.C. link 25, 25', due to the interposition of the second harmonic trap 33, 35 in shunt across its terminals 27, 28 (FIG. 1), or lines 31, 32 (FIG. 2). The sinusoidal voltage fed back from trap 33, 35 to the D.C. link output at 27, 28 is at twice frequency ($2f_o$) as aforesaid, and meshes between the ripple waves 83 yielding the rather smooth resultant input voltage per curve 85 for the inverter 40. The quite smoothed D.C. voltage 85 is optionally further filtered with shunt capacitor 37 and series inductor 39.

The exemplary polyphase power inverter system 40' in which my unique yet simple inverter input filter 30, 30' has been effectively and successfully used in practice, is now described in some more detail. The two-channel inverter 40' diagrammed in FIGS. 4 and 5 was constructed with a 60 KVA rating, in two-channels with respective inverters 55 and 56 at 30 KVA each. The system output frequency was 400 hertz, and 200 volts line-to-line at 43. The filter inductance 33 was 340 microhenries, and the capacitance 35, 100 microfarads, with $E_{DC}$ at 270 volts steady against even severe load 41 unbalance among its three phases. The power inverter system 40, 40' corresponds to that described in my aforesaid system patent, and my copending application Ser. No. 868,190, filed Oct. 21, 1969, and now U.S. Pat. No. 3,638,094 for "Polyphase Power Inverter System."

Figure 4:
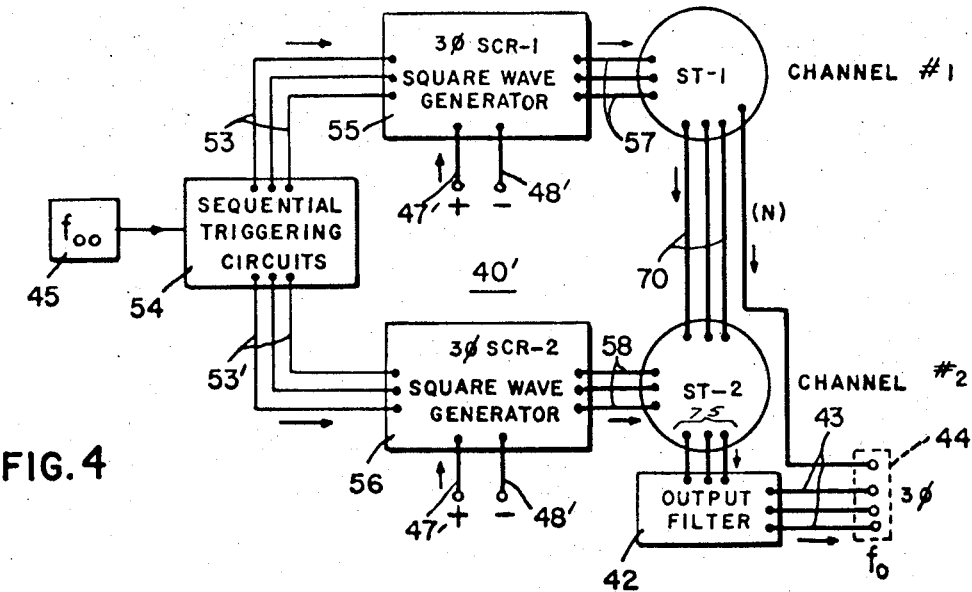
FIG. 4 is a block diagram of a two channel polyphase inverter system, corresponding to that indicated in FIG. 2.

FIG. 4 is a schematic diagram of the three-phase inverter 40 arranged in two channels. Channel No. 1 comprises square wave generator 55 that feeds into an associated output or summing transformer ST-1. Channel No. 2 comprises square wave generator 56 that feeds into its transformer ST-2. Both square wave generators 55, 56 are solid-state three-phase devices. They incorporate respective banks of silicon controlled rectifiers arranged to provide properly timed and phased voltages of sizable magnitude to transformers ST-1 and ST-2. Operation of the SCR banks is effected by sequential triggering circuits 54, which in turn are controlled by base-frequency impulses ($f_{oo}$) from Unit 45. The triggering unit 54 is shown connected by cables 53, 53' to the generators 55, 56. Exemplary circuits for units 55 and 56 are shown and described in said patent application.

The square wave generators 55, 56 are powered by the direct current lines 47', 48') from the D.C. source. Their three-phase square wave outputs are respectively applied to the primary windings: of transformer ST-1 via leads 57; and of transformer ST-2 leads 58. The transformers ST-1 and ST-2 each are of conventional three-phase configuration. The secondary windings of output transformers ST-1 and ST-2 are interconnected, in series-add, providing optimum multi-stepped waveforms at the set system output frequency ($f_o$). Such connection is indicated by multi-wire cable 70 between transformers ST-1 and ST-2; with optional fourth-wire neutral (N).

Figure 5:
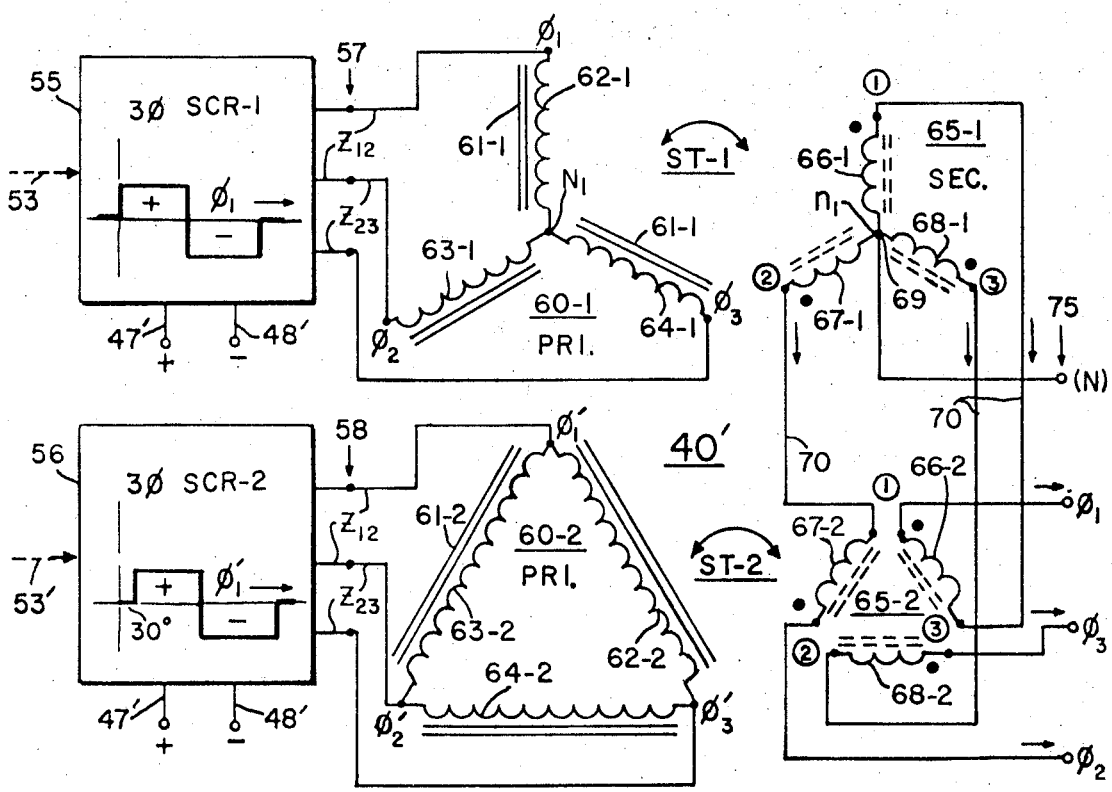
FIG. 5 is a schematic circuit diagram of the inverter of FIG. 4.

The power inverters in their more general aspects may contain any practical even-number of channels. The polyphase multi-channel inverters provide improved efficiency and are used for higher power ratings. A circuit representation of the reference summing transformer ST-1 of Channel No. 1 is shown in FIG. 5. It has a laminated iron core 61-1 with a conventional polyphase physical configuration. Its primary 60-1 comprises three-phase windings 62-1, 63-1, 64-1, interphase coupled magnetically by core 61-1. The 65-1 comprises individual three-phase windings 66-1, 67-1, 68-1 wound upon their respective primary windings. The ST-1 transformer primary and secondary 60-1, 65-1 thus comprises three phases: $\phi_1, \phi_2, \phi_3$.

The transformer ST-2 for channel No. 2 is connected in delta configuration at its primary 60-2. Also, the time-phase of the square wave input from generator SCR-2 56 to the respective primary windings 62-2, 63-2, 64-2 are in two-channel embodiment 40 time-displaced 30° vs No. 1. The result of such preset time-phase displacement yields in summation, output signals 75 of optimum stepped waveform construction. Reference summing transformer ST-1 has its primary 60-1 and secondary 65-1 connected in wye configuration. Cable 70 connects the secondary windings of the summing transformers in particualr series-add, as shown in FIG. 5, and explained in detail in said application. Balanced polyphase output signal summation occurs thereby, producing optimym stepped waveforms at system frequency $f_o$ of relatively low distortion, that are readily filtered at the output 42. Other three-phase inverters may of course be used herein, or single phase as stated hereinabove.

What is claimed is:

1. A power supply system comprising a polyphase inverter that provides multiple phase alternating current system output at a predetermined frequency ($f_o$), a direct current source for energizing said polyphase inverter, and a filter connected between the output of said source and the unidirectional power input of the said polyphase inverter, said filter consisting essentially of a sole trap specifically tuned to twice the frequency ($2f_o$) of said system output frequency ($f_o$) and connected to substantially shunt-out twice frequency undulations that are produced at the output of said source due to unbalanced loading of the polyphase system output and thereby effectively stabilize the unidirectional power input to said polyphase inverter and correspondingly substantially smooth the multiple phase alternating current output to system frequency ($f_o$).

2. A power supply system as claimed in claim 1, in which said filter trap is composed of an inductor and a capacitor proportioned to be in resonant relationship at the said twice system output frequency ($2f_o$), said filter trap being in electrical connection across the output lines of said direct current source and bypass twice frequency ($2f_o$) currents generated thereat from reaching the polyphase inverter and thereby effectively smooth the multiple phase output currents of said polyphase inverter to the system frequency ($f_o$) during the said unbalanced polyphase loading condition without a series filter inductor between said unidirectional source and the input of the polyphase inverter.

3. A power supply system as claimed in claim 2, in which said twice system frequency ($2f_o$) shunt filter trap effects the predominant filtering action at the output of said unidirectional source and thereby smoothes the multiple phase output currents of said polyphase inverter to the system frequency ($f_o$) during the said unbalanced polyphase loading condition.

* * * * *